United States Patent [19]
Sasahara et al.

[11] Patent Number: 5,881,599
[45] Date of Patent: Mar. 16, 1999

[54] CAM FOR PRESS DIE

[75] Inventors: Tadashi Sasahara; Hideyuki Morioka, both of Fujisawa, Japan

[73] Assignee: Oiles Corporation, Tokyo, Japan

[21] Appl. No.: 737,733

[22] PCT Filed: Jul. 12, 1996

[86] PCT No.: PCT/JP96/01958

§ 371 Date: Nov. 19, 1996

§ 102(e) Date: Nov. 19, 1996

[87] PCT Pub. No.: WO97/04894

PCT Pub. Date: Feb. 13, 1997

[30] Foreign Application Priority Data

Jul. 31, 1995 [JP] Japan .................................. 7-215190

[51] Int. Cl.⁶ ................................................ B21D 37/08
[52] U.S. Cl. ........................... 74/110; 100/266; 100/291; 72/315; 72/452.9
[58] Field of Search ..................... 100/291, 266; 74/110; 83/588, 627, 635, 638; 72/452.9, 315

[56] References Cited

U.S. PATENT DOCUMENTS

| | | | |
|---|---|---|---|
| 3,858,427 | 1/1975 | Euteneuer et al. ..................... | 83/627 X |
| 4,802,393 | 2/1989 | Gruchalski et al. .................. | 83/588 X |
| 5,101,705 | 4/1992 | Matusoka .............................. | 83/627 X |
| 5,231,907 | 8/1993 | Matsuoka .............................. | 83/635 X |
| 5,269,167 | 12/1993 | Gerhart .................................. | 83/635 X |

FOREIGN PATENT DOCUMENTS

| | | | |
|---|---|---|---|
| 3905789 | 9/1989 | Germany ................................. | 72/315 |
| 356091932 | 7/1981 | Japan .................................... | 72/452.9 |
| 58-175827 | 11/1983 | Japan . | |
| 58-175828 | 11/1983 | Japan . | |
| 60-99018 | 7/1985 | Japan . | |
| 60-184493 | 9/1985 | Japan . | |
| 403005018 | 1/1991 | Japan .................................... | 72/452.9 |
| 403275222 | 12/1991 | Japan .................................... | 72/315 |
| 405154557 | 1/1993 | Japan .................................... | 72/315 |

Primary Examiner—Rodney H. Bonck
Assistant Examiner—William C. Joyce
Attorney, Agent, or Firm—Nixon & Vanderhye

[57] ABSTRACT

A cam (1) for a press die comprises: a movable cam slide (3) having a cam slide (3) which has a cam surface (2) and is movable in an X-direction; a cam driver (4) for moving the cam slide (3) in the X-direction by abutting against the cam surface (2) of the cam slide (3); and a returning spring (5) for returning the cam slide (3) to its original position. The returning spring (5) is disposed in a bottomed hole (11) formed in the cam slide (3) and whose one end (41) abuts against a main body (12) of the cam slide (3) in the bottomed hole (11), a holder (43) holds the coil spring (42). The holder (43) is provided with a rod (45) which is slidably passed through a through hole (44) and extends through the bottomed hole (11) in such a manner as to be surrounded by the coil spring (42); and a spring seat (48) which is provided in threaded engagement with one end portion (47) of the rod (45) at a bottomed-hole (11) side so as to receive another end (46) of the coil spring (42).

21 Claims, 5 Drawing Sheets

CAM FOR PRESS DIE

TECHNICAL FIELD

The present invention relates to a cam for a press die.

BACKGROUND ART

A cam for a press die is generally comprised of a movable cam slide having a cam surface, a cam driver for moving the cam slide by abutting against the cam surface of the cam slide, and a returning means for returning the cam slide to its original position. As the returning means, there is one in which a hole is formed in a base member of a lower die or an upper die, a guide pin of a coil spring is embedded in the cam slide, and the coil spring is inserted and fixed in the hole formed in the base in such a manner as to surround the guide pin. Additionally, there is a returning means which uses a spring unit.

According to the former returning means, to withdraw the cam slide from the cam, it is necessary to remove an end plate from the base member of the upper die or the lower die, and then to move the cam slide in such a way that the coil spring and the guide pin are located outside the hole in the base member. In a case where this movement of the cam slide cannot be effected due to an interfering object or the like, the withdrawal of the cam slide alone from the cam becomes impossible, so that, under the situation, the overall cam must be removed from the die.

On the other hand, according to the latter returning means, since this returning means is arranged such that a coil spring and the like are provided outside and below the cam slide, a large installation space is required, and it is difficult to provide a sliding guide surface below the cam slide to slidingly guide the movement of the cam slide. Since these members are provided in such a manner as to avoid the spring unit, the transverse width of the cam slide becomes large, which also requires a large installation space. Hence, this type of returning means is not very satisfactory.

The present invention has been devised in view of the above-described aspects, and it is an object of the present invention to provide a cam for a press die which makes it possible to easily withdraw the cam slide alone in the fabrication of the die, maintenance, inspection, and the like, and which makes it possible to reduce its occupying space.

DISCLOSURE OF INVENTION

In accordance with the present invention, the above-described object is attained by a cam for a press die, comprising: a movable cam slide having a cam surface, a cam driver for moving the cam slide by abutting against the cam surface of the cam slide, and returning means for returning the cam slide to its original position, wherein the returning means includes a coil spring which is disposed in a bottomed hole formed in the cam slide and whose one end abuts against the cam slide, and holding means for holding the coil spring, and the holding means includes a rod which is passed through the cam slide and extends through the bottomed hole in such a manner as to be surrounded by the coil spring, and a spring seat which is provided at one end portion of the rod at a bottomed-hole side so as to receive another end of the coil spring.

In a preferred example of the present invention, an expanded portion for preventing the rod from coming off the cam slide is formed at another end portion of the rod. In addition, although the cam slide may be either of a lower-mounted cam type or of a suspended cam type, in preferred examples, in the case of the lower-mounted cam type, a rectangular recess is formed in a base of a lower die side, while in the case of the suspended cam type, a rectangular recess is formed in a base of an upper die side. The cam slide is disposed movably in the rectangular recess, the rod is disposed between a front wall and a rear wall of the rectangular recess side, and the spring seat is capable of abutting against the front wall. Incidentally, sliding members which respectively abut slidably against a bottom wall and side walls of the rectangular recess may be respectively attached to a bottom wall or an upper wall and side walls of the cam slide. Further, a stepped portion may be formed at each of side walls of the cam slide, and a holding plate may be provided for holding the cam slide movably by engaging the stepped portion.

In the present invention, the cam driver may include a main body and a sliding member attached to an inclined surface of the main body, and an outer surface of the sliding member may be caused to abut against the cam surface of the cam slide to move the cam slide. Alternatively or at the same time, the cam slide may include a main body and a sliding member attached to an inclined surface of the main body, and an outer surface of the sliding member may be used as the cam surface.

In the present invention, in a case where a large returning force is required such as in a case where a multiplicity of tools are provided on the cam slide, the cam for a press die may be configured by providing a plurality of returning means described above.

In accordance with the present invention, it is possible to provide a cam for a press die which is capable of easily withdrawing only the cam slide from the base during the fabrication, maintenance, and inspection of the die, and of reducing the occupying space. In addition, it becomes unnecessary to design disposition of the spring unit with respect to the bottom wall or the upper wall of the main body of the cam slide, so that the design of the cam is rendered very easy. In addition, the bottom wall or the upper wall of the main body of the cam slide can be used as the sliding and supported surface of the cam slide directly or via a sliding member. Therefore, it is possible to obtain a sufficiently large sliding and supported surface of the cam slide, which makes it possible to increase the processing capability of the cam. Moreover, since the load per unit area at the sliding and supported surface of the cam slide can be reduced, it is possible to minimize wear at this portion.

Next, a more detailed description will be given of the above-described invention and its object and other aspects of the invention and their objects on the basis of preferred embodiments illustrated in the drawings. It should be noted that the present invention is not limited to these embodiments.

EMBODIMENTS

Figure 1:
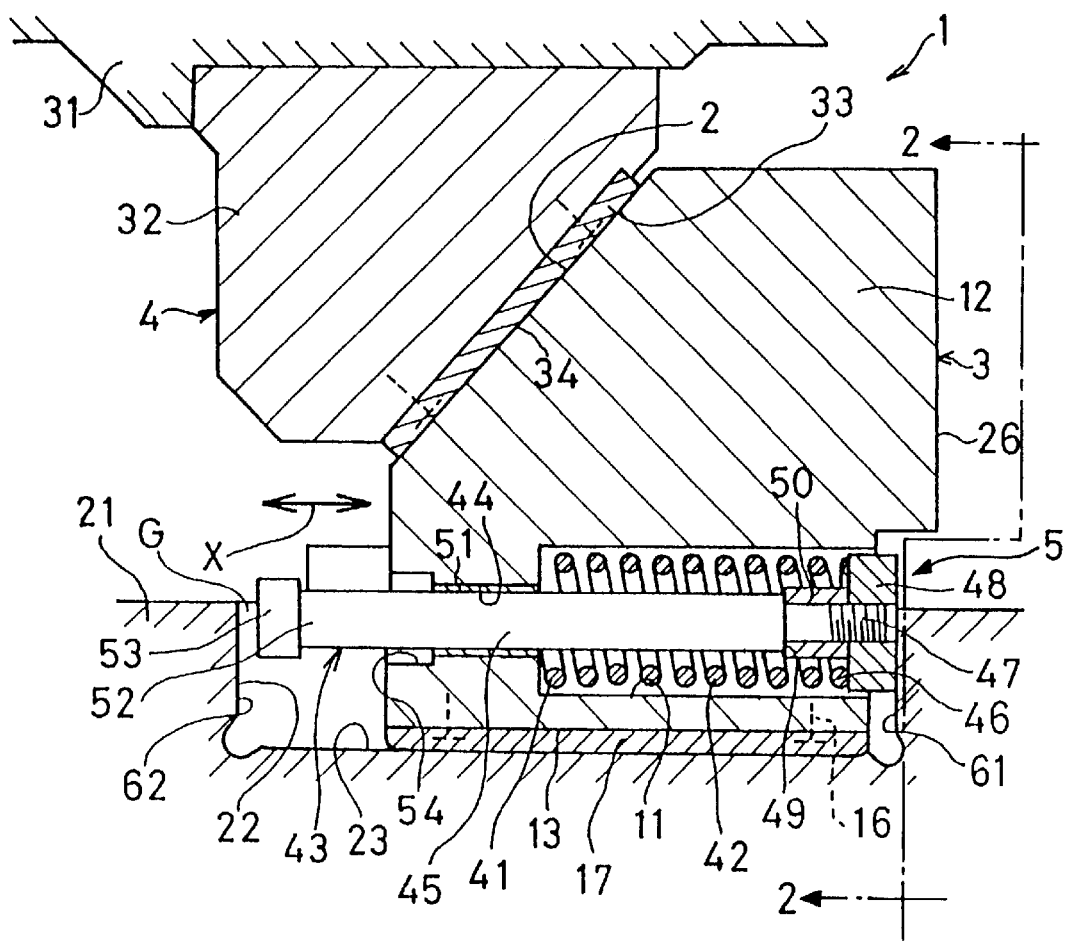
FIG. 1 is a side cross-sectional view of a preferred embodiment of the present invention.
Figure 2:
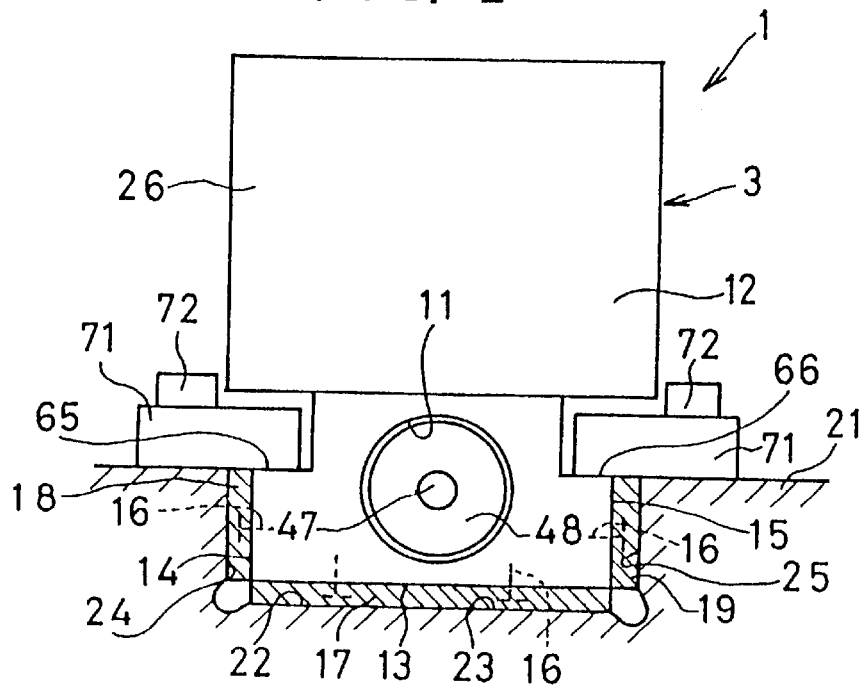
FIG. 2 is an explanatory cross-sectional view of the embodiment shown in FIG. 1 taken about on line 2—2 in FIG. 1.

In FIGS. 1 and 2, a cam 1 for a press die in this example is comprised of a cam slide 3 which has a cam surface 2 and is movable in an X-direction (horizontal direction); a cam driver 4 for moving the cam slide 3 in the X-direction by abutting against the cam surface 2 of the cam slide 3; and a returning means 5 for returning the cam slide 3 to its original position.

The cam slide 3 is provided with a main body 12 having a bottomed hole 11 in its lower portion, and sliding members 17, 18, and 19 which are respectively attached to a bottom wall 13 and both side walls 14 and 15 of the main body 12 by means of screws or bolts 16 or the like. The cam slide 3 in this example is a lower-mounted cam type, a rectangular recess 22 is formed in a base 21 of the lower die, the cam slide 3 is disposed in the rectangular recess 22 in such a manner as to be movable in the X-direction, and the sliding members 17, 18 and 19 respectively abut against a bottom wall 23 and both side walls 24 and 25 of the rectangular recess 22 in such a manner as to be slidable in the X-direction. A tool such as a cutting blade is attached to a front surface 26 of the main body 12.

The cam driver 4 is provided with a main body 32 attached to a base 31 of the upper die, and a sliding member 33 attached to an inclined surface of the main body 32 by means of screws, bolts, or the like, and an outer surface of the sliding member 33 constitutes a cam surface 34 which abuts against the cam surface 2 of the cam slide 3.

The returning means 5 is provided with a coil spring 42 which is disposed in the bottomed hole 11 formed in the cam slide 3 and whose one end 41 abuts against the main body 12 of the cam slide 3 in the bottomed hole 11, and a holding means 43 for holding the coil spring 42. The holding means 43 is provided with a rod 45 which is passed through a through hole 44 formed in the main body 12 of the cam slide 3 and extends through the bottomed hole 11 in such a manner as to be surrounded by the coil spring 42; a spring seat 48 which is provided in threaded engagement with one end portion 47 of the rod 45 at a bottomed-hole 11 side so as to receive another end 46 of the coil spring 42; and a collar 50 which is interposed between a stepped portion 49 of the rod 45 and the spring seat 48. A bush 51 for smoothing the movement of the cam slide 3 in the X-direction is provided in the through hole 44 between the rod 45 and the main body 12 in such a manner as to be fixed to the main body 12. In this example, the rod 45 is passed through the through hole 44 in such a manner as to be relatively slidable in the X-direction with respect to the bush 51. An expanded portion 53 for preventing the rod 45 from coming off the main body 12 is formed at another end 52 of the rod 45, and a recess 54 for receiving the expanded portion 53 when the cam slide 3 has returned to its original position is formed in the main body 12. The rod 45 is disposed between a front wall 61 and a rear wall 62 of the rectangular recess 22, the spring seat 48 is capable of abutting against the front wall 61, and the expanded portion 53 is disposed in face-to-face relation to the rear wall 62 with a gap G.

Stepped portions 65 and 66 are respectively formed on both side walls 14 and 15 of the main body 12 of the cam slide 3, and holding plates 71, which respectively engage the stepped portions 65 and 66 and hold the cam slide 3 movably in the X-direction, are secured to the base 21 by means of screws or bolts 72 or the like.

Figure 3:
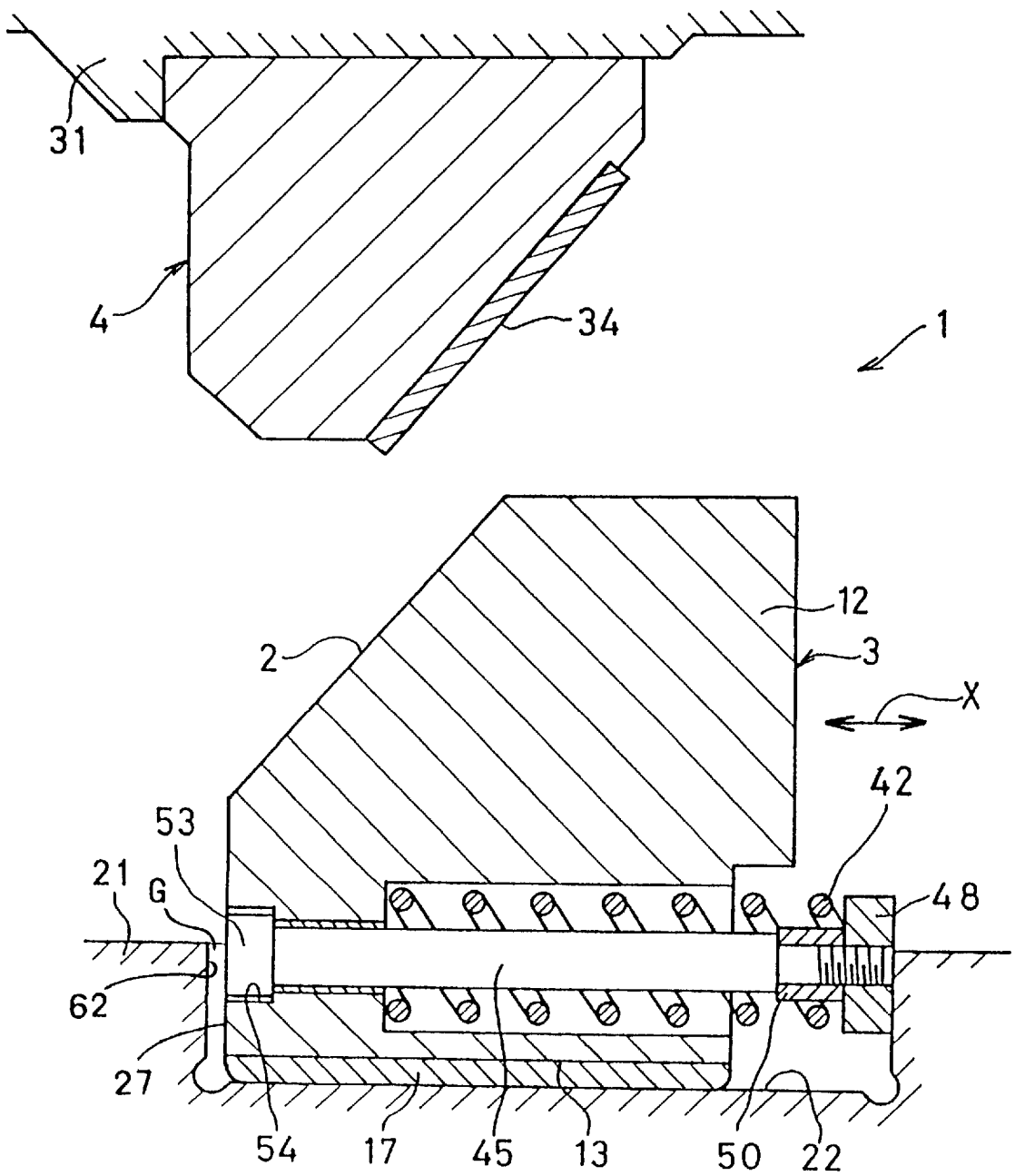
FIG. 3 is a diagram for explaining the operation of the embodiment shown in FIG. 1.

With the cam 1 for a press die which is provided with the cam slide 3 of a lower-mounted type which is mounted on the base 21 of the lower die as described above, when the cam driver 4 is located at a raised position as shown in FIG. 3, the cam slide 3 has been returned to its original position by the resiliency of the coil spring 42. When the cam slide 3 has been returned to its original position in this manner, the gap G is formed between the rear wall 62 and a rear surface 27 of the main body 12 of the cam slide 3. When the cam driver 4 is lowered due to the operation of a hydraulic ram or the like, the cam surface 34 of the cam driver 4 abuts against the cam surface 2 of the cam slide 3. Consequently, at the same time as the cam driver 4 is further lowered, the cam slide 3 is moved in the X-direction against the resiliency of the coil spring 42, and is located at the position shown in FIG. 1. In the movement of the cam slide 3 in the X-direction, a workpiece is subjected to press working including punching or the like by means of a tool attached to the front surface of the cam slide 3. After completion of the press working, the cam driver 4 is raised, so that the cam slide 3 is also returned to its original position by the resiliency of the coil spring 42, as shown in FIG. 3.

With the cam 1 for a press die, if the holding plates 71 are removed after loosening the screws or bolts 72 or the like, the cam slide 3 can be withdrawn simply from the base 21, so that the attachment and detachment of the cam slide 3 can be effected simply and easily. In addition, since the sliding members 17, 18, and 19 are respectively attached to the bottom wall 13 and the both side walls 14 and 15 of the main body 12, and the cam slide 3 can be supported movably in the X-direction by these sliding members, the movement of the cam slide 3 in the X-direction is effected in a stable manner, allowing the processing using the cam slide 3 to be effected accurately. Moreover, since the returning means 5 is mounted virtually at a lower portion of the cam slide 3, the occupying space can be made small, thereby making it possible to provide a compact cam for a press die.

Figure 4:
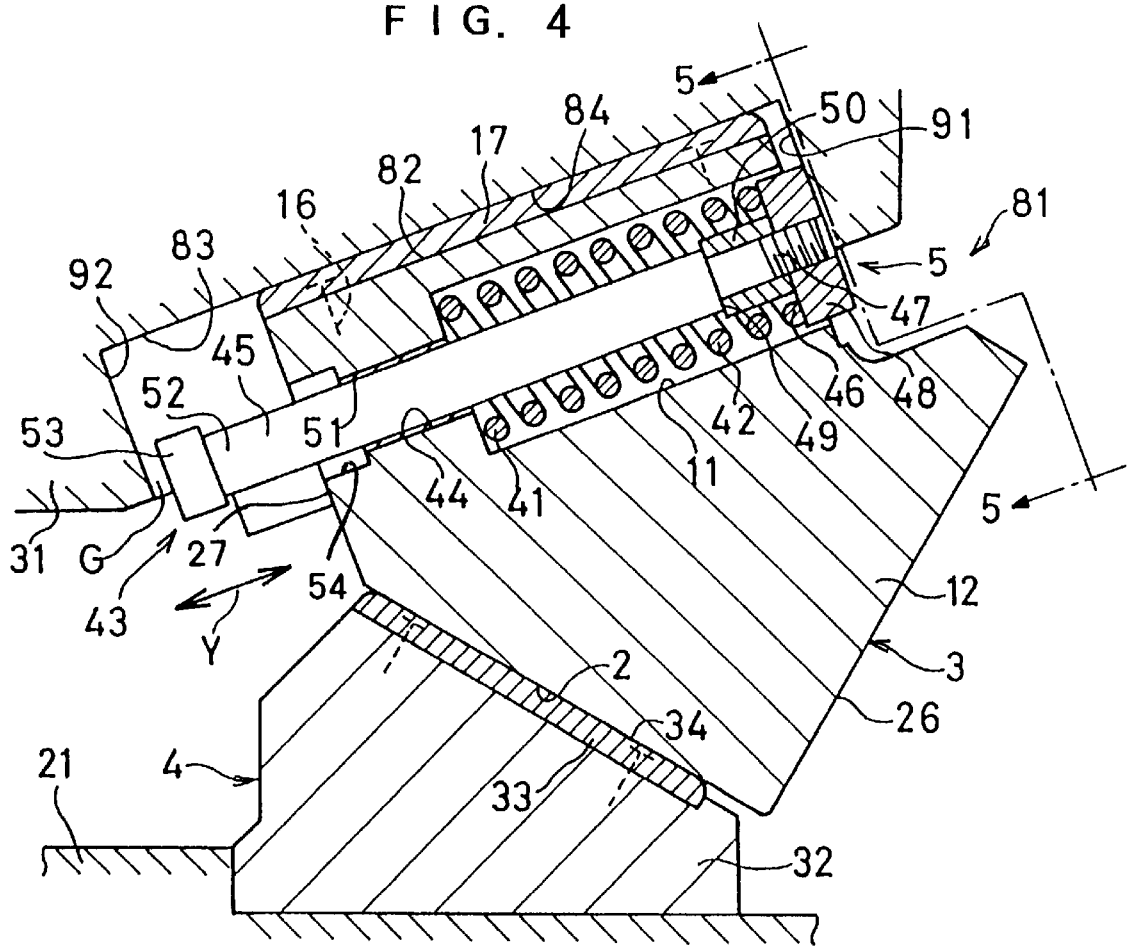
FIG. 4 is a side cross-sectional view of another preferred embodiment of the present invention.
Figure 5:
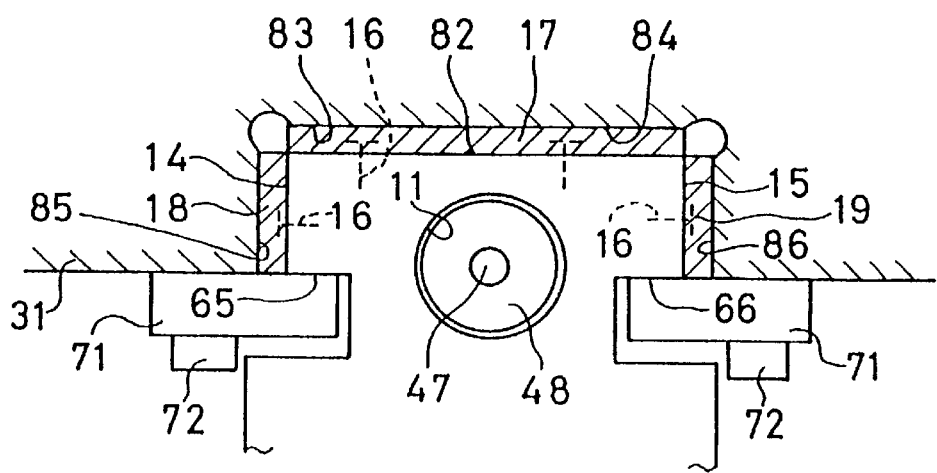
FIG. 5 is an explanatory cross-sectional view of the embodiment shown in FIG. 4 taken about on line 5—5 in FIG. 4.

The above example is a cam for a press die whose cam slide 3 is configured as the lower-mounted cam type, but the cam slide 3 may be alternatively configured as a suspended-cam type, as shown in FIGS. 4 and 5. Hereafter, a description will be given of a cam 81 for a press die which is shown in FIGS. 4 and 5. The cam 81 for a press die is comprised of the cam slide 3 which has the cam surface 2 and is movable in a Y-direction (diagonal direction); the cam driver 4 for moving the cam slide 3 in the Y-direction by abutting against the cam surface 2 of the cam slide 3; and the returning means 5 for returning the cam slide 3 to its original position. The cam slide 3 is provided with the main body 12 having the bottomed hole 11 in its upper portion, and the sliding members 17, 18, and 19 which are respectively attached to an upper wall 82 of the main body and the both side walls 14 and 15 by means of the screws or bolts 16 or the like.

A rectangular recess 83 is formed in the base 31 of the upper die, the cam slide 3 is disposed in the rectangular recess 83 in such a manner as to be movable in the Y-direction, and the sliding members 17, 18, and 19 respectively abut against a bottom wall 84 and both side walls 85 and 86 of the rectangular recess 83 in such a manner as to be slidable in the Y-direction. A tool such as a cutting blade is attached to the front surface 26 of the main body 12.

The cam driver 4 is provided with the main body 32 attached to the base 21 of the lower die, and the sliding member 33 attached to an inclined surface of the main body 32 by means of screws, bolts, or the like, and an outer surface of the sliding member 33 constitutes the cam surface 34 which abuts against the cam surface 2 of the cam slide 3. The returning means 5 is provided with the coil spring 42 which is disposed in the bottomed hole 11 formed in the cam slide 3 and whose one end 41 abuts against the main body 12 of the cam slide 3 in the bottomed hole 11, and the holding means 43 for holding the coil spring 42. The holding means 43 is provided with the rod 45 which is passed through the through hole 44 formed in the main body 12 and extends through the bottomed hole 11 in such a manner as to be surrounded by the coil spring 42; the spring seat 48 which is provided in threaded engagement with one end portion 47 of the rod 45 at the bottomed-hole 11 side so as to receive the other end 46 of the coil spring 42; and the collar 50 which is interposed between the stepped portion 49 of the rod 45 and the spring seat 48.

The bush 51 for smoothing the movement of the cam slide 3 in the Y-direction is provided in the through hole 44 between the rod 44 and the main body 12 in such a manner as to be fixed to the main body 12. The rod 45 is passed through the through hole 44 in such a manner as to be relatively slidable in the Y-direction with respect to the bush 51. The expanded portion 53 for preventing the rod 45 from coming off the main body 12 is formed at the other end portion 52 of the rod 45, and the recess 54 for receiving the expanded portion 53 when the cam slide 3 has returned to its original position is formed in the main body 12. The rod 45 is disposed between a front wall 91 and a rear wall 92 of the rectangular recess 83, the spring seat 48 is capable of abutting against the front wall 91, and the expanded portion 53 is disposed in face-to-face relation to the rear wall 92 with a gap G. The gap G is also formed between the rear wall 92 and the rear surface 27 of the main body 12 of the cam slide 3 when the cam slide 3 is returned to its original position.

The stepped portions 65 and 66 are respectively formed on the both side walls 14 and 15 of the cam slide 3, and the holding plates 71, which respectively engage the stepped portions 65 and 66 and suspend and hold the cam slide 3 movably in the Y-direction, are secured to the base 31 by means of the screws or bolts 72 or the like.

With the cam 81 for a press die configured as described above, at the same time as the base 31 is lowered or raised, the cam slide 3 is also lowered or raised, and the cam slide 3 is moved in the Y-direction during this lowering or raising. Thus, it is possible to obtain operation and effects similar to those of the cam 1 for a press die.

Figure 6:
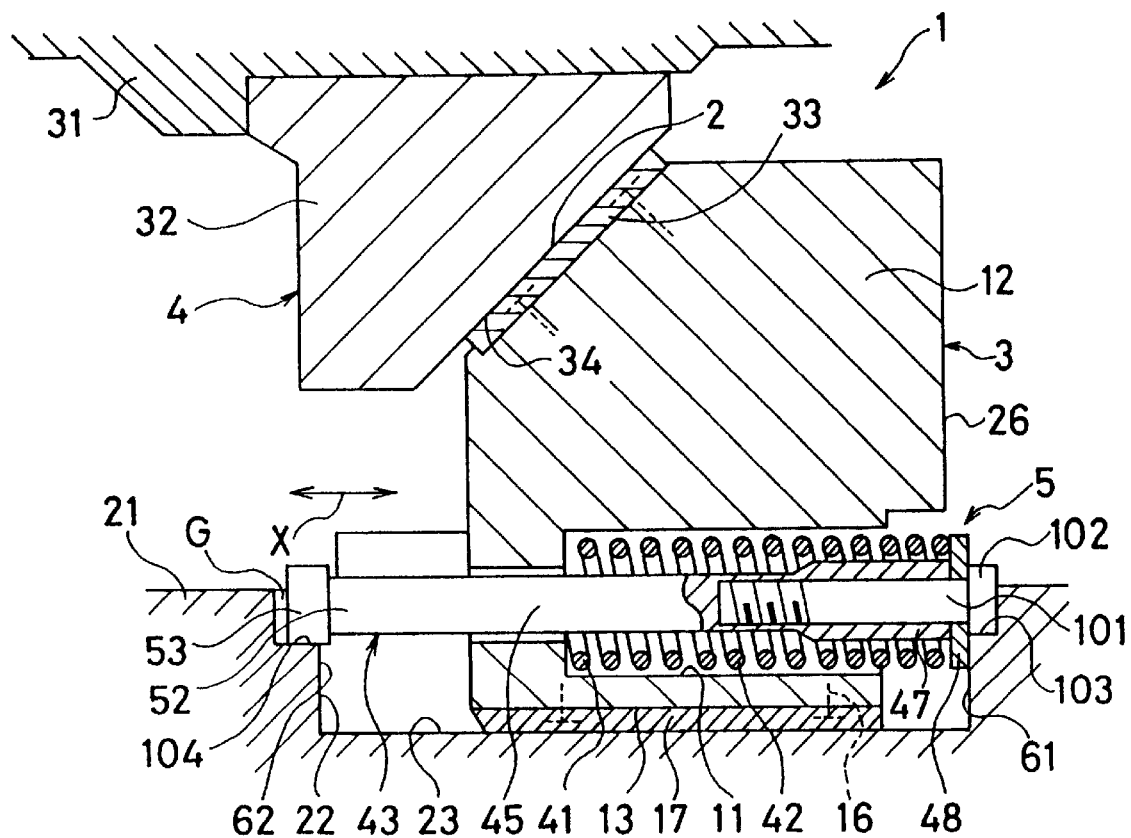
FIG. 6 is a side cross-sectional view of still another preferred embodiment of the present invention.

Although, in the above-described example, the cam driver 4 is comprised of the main body 32 and the sliding member 33 attached to the inclined surface of the main body 32 by means of screws, bolts, or the like, an arrangement may be alternatively provided such that, as shown in FIG. 6, the cam slide 3 is comprised of the main body 12 and the sliding member 33 attached to the inclined surface of the main body 12 by means of screws, bolts, or the like, an outer surface of the sliding member 33 is formed as the cam surface 2 of the cam slide 3, and an inclined surface of the main body 32 of the cam driver 4 is formed as the cam surface 34 which abuts against the cam surface 2 of the cam slide 3. Further, as shown in FIG. 6, the spring seat 48 may be provided at one end portion 47 of the rod 45 in such a manner as to be clamped by the end portion 47 of the rod 45 and an expanded head portion 102 of a bolt 101 which is threadedly inserted in the rod 45. Moreover, stepped recesses 103 and 104 for positioning may be respectively formed at the front wall 61 and the rear wall 62 of the rectangular recess 22, and the expanded head portion 102 and the expanded portion 53 may be respectively disposed at the stepped recesses 103 and 104.

Figure 7:
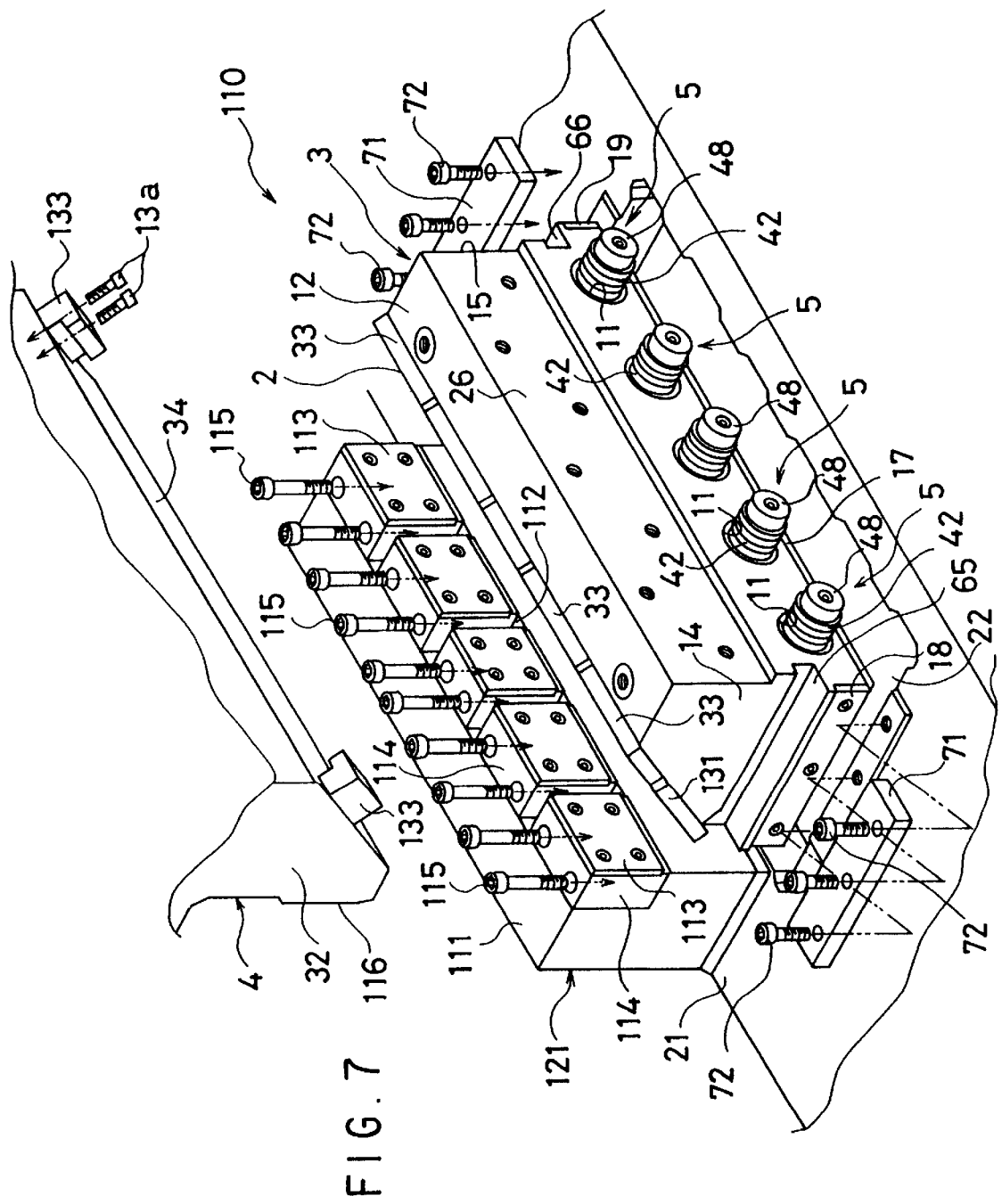
FIG. 7 is a perspective view of a further preferred embodiment of the present invention.

A cam 110 for a press die shown in FIG. 7 is an example of a case where a large returning force is required such as in a case where a multiplicity of tools are provided on the front surface 26 of the cam slide 3. The cam 110 for a press die in this example is configured such that a plurality of, in this case five, returning means 5 described above are juxtaposed. In addition, in the cam 110 for a press die, a reinforcing support member 111 is provided uprightly on the base 21 integrally therewith. A plurality of blocks 114 each provided with a sliding member 113 are attached to a stepped portion 112 of the reinforcing support member 111 by means of bolts 115. The arrangement provided is such that, during lowering, the cam driver 4 is reinforced and supported at its rear surface 116 by the reinforcing supporting member 111 as the rear surface 116 of the main body 32 is brought into sliding contact with the sliding member 113. If the cam 110 for a press die is configured by being provided with a reinforcing support means 121 having such a reinforcing support member 111 and the like, the escape of the cam driver 4 can be prevented even in cases where the load is large, thereby making it possible to effect pressing as desired.

Further, the cam 110 for a press die of this example shown in FIG. 7 is provided with a forcibly returning mechanism. The forcibly returning mechanism is provided with projections 131, which are respectively provided on the both side walls 14 and 15 of the main body 12 of the cam slide 3 (the projection on the side wall 15 is not shown), and a pair of hook members 133 which are attached to opposite ends of the cam surface 34 of the cam driver 4 by means of bolts 13a so as to engage with respective projections 131 during the lowering of the cam driver 4. During an early period of the raising of the cam driver 4, the forcibly returning mechanism imparts an initial returning force to the cam slide 3 through the hook members 133 and the projections 131 which engage each other. After the raising of the cam driver 4 by a fixed amount, the engagement between the hook members 133 and the projections 131 is canceled.

We claim:

1. A combination of a press die and a cam device for the press die, comprising:

a base having a rectangular recess;

a movable cam slide movably disposed in said recess and having a cam surface;

a cam driver for moving said cam slide by abutting against the cam surface of said cam slide; and returning means for returning said cam slide to its original position;

wherein said returning means includes a coil spring which is disposed in a hole formed in said cam slide and whose one end abuts against said cam slide in the hole, and holding means for holding said coil spring, and said holding means includes a rod which is axially movably passed through said cam slide and extends in and through the hole in such a manner as to be surrounded by said coil spring, said rod having a spring seat at one end portion thereof and an expanded portion at another end portion thereof, said spring seat receiving another end of said coil spring, said expanded portion preventing said rod from coming off said cam slide, said rod including said spring seat and said expanded portion being axially movably disposed between front and rear walls of said rectangular recess, said spring seat being urged toward said front wall of rectangular recess by means of a spring force of said coil spring, said expanded portion facing to said rear wall of said rectangular recess with a gap therebetween.

2. A combination according to claim 1, wherein the said rectangular recess is formed in a base of a lower die.

3. A combination according to claim 2, wherein sliding members which respectively abut slidably against a bottom wall and side walls of the rectangular recess are respectively attached to a bottom wall and side walls of a main body of said cam slide.

4. A combination according to claim 1, wherein said rectangular recess is formed in a base of an upper die side, and said cam slide is suspended from the base.

5. A combination according to claim 4, wherein sliding members which respectively abut slidably against an upper wall and side walls of the rectangular recess are respectively attached to an upper wall and side walls of a main body of said cam slide.

6. A combination according to claim 1, wherein said spring seat abuts against said front wall.

7. A combination according to claim 1, wherein said cam slide has side walls opposing each other, a stepped portion being formed at each of said side walls of said cam slide, and a holding plate is provided for movably holding said cam slide by engaging said stepped portion.

8. A combination according to claim 1, wherein said cam driver includes a main body and a sliding member attached to an inclined surface of said main body, and an outer surface of said sliding member is arranged to move said cam slide by abutting against the cam surface of said cam slide.

9. A combination according to claim 1, wherein said cam slide includes a main body and a sliding member attached to an inclined surface of said main body, and an outer surface of said sliding member constitutes the cam surface.

10. A combination according to claim 1, wherein said cam device is provided with a plurality of returning means.

11. A combination of a press die and a cam device for the press die, comprising:

a base having a rectangular recess;

a movable cam slide movably disposed in said recess and having a cam surface;

a cam driver for moving said cam slide from an original position by abutting against the cam surface of said cam slide; and returning means for returning said cam slide to said original position;

said returning means including a coil spring disposed in a hole formed in said cam slide with one end of the coil spring abutting said cam slide in said hole, and holding means for holding said coil spring, said holding means including a rod axially movably passed through said cam slide and extending in and through said hole, said coil spring surrounding said rod in said hole, said rod having at one end portion thereof a spring seat for receiving another end of said coil spring, said rod including said spring seat being axially movably disposed between front and rear walls of said rectangular recess, said spring seat being urged toward said front wall of said rectangular recess by means of a spring force of said coil spring, another end portion of said rod facing said rear wall of said rectangular recess defining a gap therewith.

12. A combination according to claim 11, wherein said rectangular recess is formed in the base of a lower die.

13. A combination according to claim 12, wherein sliding members which respectively abut slidably against a bottom wall and side walls of the rectangular recess are respectively attached to a bottom wall and side walls of a main body of said cam slide.

14. A combination according to claim 11, wherein said rectangular recess is formed in the base of an upper die side, and said cam slide is suspended from the base.

15. A combination according to claim 14, wherein sliding members which respectively abut slidably against an upper wall and side walls of the rectangular recess are respectively attached to an upper wall and side walls of a main body of said cam slide.

16. A combination according to claim 11, wherein said spring seat abuts against said front wall.

17. A combination according to claim 11, wherein said cam slide has side walls opposing to each other, and a stepped portion is formed at each of said side walls of said cam slide, and a holding plate is provided for holding said cam slide movably by engaging said stepped portion.

18. A combination according to claim 11, wherein said cam driver includes a main body and a sliding member attached to an inclined surface of said main body, and an outer surface of said sliding member is arranged to move said cam slide by abutting against the cam surface of said cam slide.

19. A combination according to claim 11, wherein said cam slide includes a main body and a sliding member attached to an inclined surface of said main body, an outer surface of said sliding member constituting the cam surface.

20. A combination according to claim 11, wherein said cam device is provided with a plurality of returning means.

21. A combination according to claim 11, wherein said rod has at said another end portion an expanded portion for preventing said rod from coming off said cam slide.

* * * * *